March 28, 1972   L. SCHLEMMER ET AL   3,652,759
PRODUCTION OF BIAXIALLY ORIENTED POLYAMIDE FILM
Filed Jan. 8, 1970   2 Sheets-Sheet 1

INVENTORS:
LOTHAR SCHLEMMER
EUDALDO SABATER
GERHARD KRESS
BY
Johnston, Root, O'Keeffe, Keil, Thompson & Shurtleff
ATT'YS

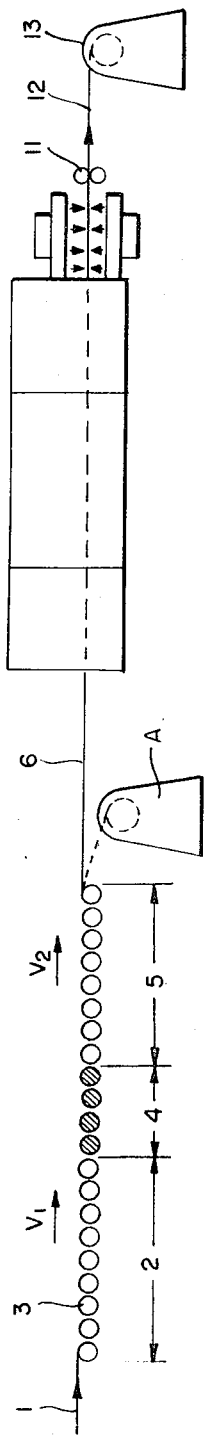
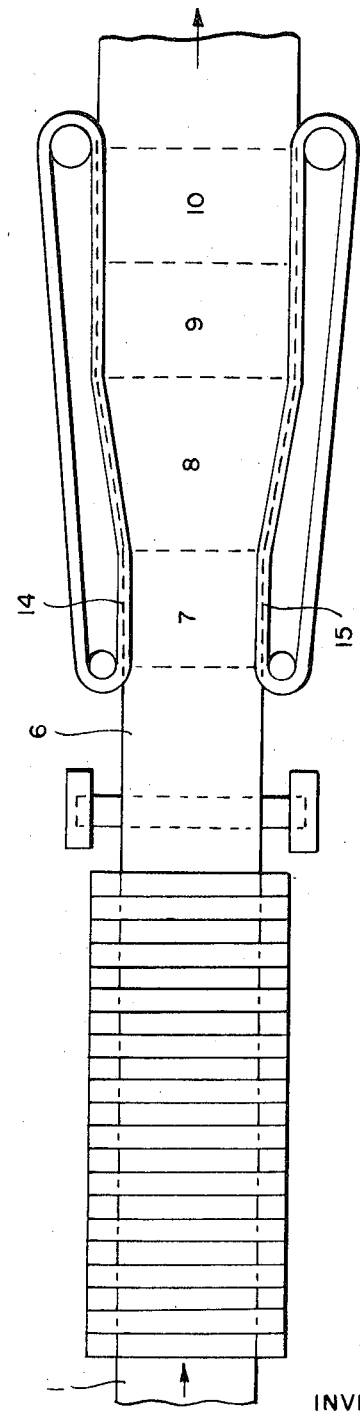
FIG. 2a
FIG. 2b 3,652,759
PRODUCTION OF BIAXIALLY ORIENTED
POLYAMIDE FILM
Lothar Schlemmer, Fussgonheim, Eudaldo Sabater, Hassloch, and Gerhard Kress, Ludwigshafen, Germany, assignors to Badische Anilin- & Soda-Fabrik Aktiengesellschaft, Ludwigshafen (Rhine), Germany
Filed Jan. 8, 1970, Ser. No. 1,437
Claims priority, application Germany, Jan. 10, 1969,
P 19 01 059.4
Int. Cl. B29d 7/24
U.S. Cl. 264—289
3 Claims

ABSTRACT OF THE DISCLOSURE

Improved biaxially oriented polyamide film, particularly suitable for packaging applications, may be made from amorphous film or sheeting by drawing the same in the machine direction at a draw ratio of 2.5:1 to 4:1, drawing being effected in the free paths in the gaps between non-driven draw rolls of diameter 40 to 150 mm., said free paths being less than 22 mm. long in all cases and said rolls being held at specific temperatures depending on their peripheral speeds, and then drawing the sheeting transversely at a draw ratio of 3:1 to 6:1 and at a temperature of 165 to 205° C.

---

Figure 1:
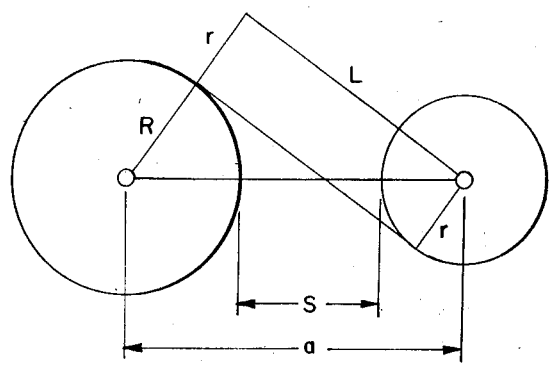

This invention relates to a method of producing biaxially oriented polyamide film having improved physical properties by drawing substantially amorphous sheeting in two stages using a roll drawing machine for drawing in the machine direction and a clip drawing machine for drawing in the transverse direction. The invention also relates to an apparatus for effecting drawing in the machine direction according to the present method.

Two-stage film stretching methods are known in which polyester and vinyl polymer films may be stretched biaxially. However, the known methods are unsuitable for the two-stage drawing of polyamide film due to the formation of stable hydrogen bonds during the first drawing stage accompanied by substantial crystallization in the film. In one proposed method of improving the drawability of polyamide film in the two-stage method a monomer is included in the film to act as plasticizer. However, in many applications, plasticized film is distinctly inferior to polyamide film free of plasticizer.

Another known method comprises simultaneously drawing polyamide film in the machine and transverse directions. This method may only be carried out on a complicated two-way drawing machine whose limited use in film processing makes the method an unduly expensive commercial proposition. Simultaneous drawing in two directions, when compared with successive drawing in two stages, has the added disadvantage of producing broad marginal areas of unevenly stretched film which constitutes a high wastage factor. Furthermore, those portions of the web of film which are not gripped by the clips tend to be overstretched at the edges to such an extent that tearing readily occurs.

It is an object of the invention to provide a two-stage method of manufacturing biaxially oriented polyamide film which allows trouble-free operation with low wastage on an industrial scale using roll and clip drawing machines for drawing in the forward and transverse directions respectively.

We have now found that the production of biaxially oriented polyamide film having improved physical properties by successively drawing non-oriented or only slightly oriented sheeting on a roll drawing machine for drawing in the machine direction and a further machine for drawing in the transverse direction can be carried out with particular advantage by heating the substantially amorphous polyamide sheeting feed stock to a temperature of from 70° to 150° C. during the initial draw in the machine direction, the preheating time being not longer than 30 seconds, drawing the sheeting rapidly to 2.5 to 4 times its original length in its free paths L of less than 22 mm. in length in the gaps between non-driven drawing rollers having a diameter ranging from 40 to 150 mm., all drawing rollers which assume a peripheral speed below the take-off speed of the sheeting or the said take-off speed less 10% of the maximum speed difference being at a temperature ranging from 120° to 160° C. whilst the immediately following non-driven and/or driven rollers are at a temperature below 80° C., and drawing the sheeting, after optional reeling, transversely in known manner to 3 to 6 times its width at a drawing temperature of 165° to 205° C., optionally heat-setting it at a temperature between the final drawing temperature and the melting point of the polyamide and then cooling it to below 80° C. whilst preventing the film from shrinking in the transverse direction by more than 10%.

Starting from substantially amorphous polyamide sheeting, that is, sheeting having a density below 1.135 g./cm.$^3$ and, generally, a thickness of 100 to 600 microns and in particular of 100 to 300 microns, the sheeting is first subjected to drawing in the machine direction. Drawing times (i.e. the times during which a specific area, e.g. 1 cm.$^2$, of the film is effectively drawn) of less than 1 second and preferably less than 0.2 second are particularly suitable at drawing temperatures between 120° and 160° C. Drawing time is defined as follows:

$$\text{Drawing time } t_e = \frac{L}{V_2 - V_1} \cdot \ln \frac{V_2}{V_1}$$

where:

L is the total length of that free portion of the sheeting which is subjected to drawing, as measured in the machine direction,
$V_1$ is the feed-in speed of the sheeting, and
$V_2$ is the take-off speed of the sheeting.

The free portion of the sheeting is taken as the basis for calculating the drawing time because that portion of the sheeting which rests against the rollers in the series of drawing rollers is not drawing during the time it is in contact with the roller, since the film is held against the roller surface by frictional forces. If, due to an inadequate looping angle or too low a preheating temperature, these frictional forces are not large enough to maintain the edge of the sheeting on the individual rollers at right angles to the generatrix of the roller, drawing is uneven and "scalloping" occurs.

In order to avoid the occurrence of cold drawing and to achieve good adhesion on the driving rollers in the preheating zone, the polyamide sheeting is preheated to a temperature between 70° and 150° C. At a film thickness between 100 and 300 microns temperatures between 80° and 100° C. have proved particularly suitable. The preheating period should be short and not exceed 30 seconds. For a drawing time of less than 0.2 second the preheating period should advantageously not exceed 10 seconds, whilst it can be 20 to 25 seconds for a drawing time of about 1 second.

An important feature of the invention is the immediate cooling of the film after it has been drawn in the machine direction. The number of drawing rolls required for simultaneous drawing is chosen mainly according to the rate of drawing, the draw ratio, the thickness of the sheeting and the properties of the material. It is beneficial to keep only that number of drawing rollers at the drawing tempertaure as are immediately concerned with the effective drawing of the film. This may be determined by measuring and comparing the peripheral speeds of the rollers. According to the invention, those rollers having a peripheral speed which is equal to the take-off speed or its greater than the figure obtained by subtracting 10% of the maximum speed difference (take-off speed minus feed-in speed) from the take-off speed of the sheeting are maintained at a temperature of less than 80° C., preferably between about 20° C. and 40° C. A polyamide film always tends to "neck in" during drawing, the major part of the drawing being usually completed in the first two draw gaps. Thus, in general, only a few drawing rollers are necessary. In most cases 3 to 6 draw graps are sufficient, and under particularly suitable conditions only one draw gap may suffice.

The invention also relates to an apparatus for carrying out the longitudinal draw according to the method of the invention whilst preventing excessive necking-in of the sheeting and thus effecting slight transverse orientation during the operation of drawing in the machine direction.

In the apparatus of the invention the width of the sheeting is substantially maintained by keeing the free paths of the sheeting between adjacent draw rolls as short as possible. The length of the free path of the sheeting is expresed below a function of the radii of the rollers and their separation, with reference to FIG. 1:

$$L^2 = a^2 - (R+r)^2 \quad a = R+s+r$$

thus the free path $L = \sqrt{(R+s+r)^2 - (R+r)^2}$

If $R = r$, $$L = \sqrt{4rs + s^2}$$

The length of the free path assumes desirable values and high contact pressures, that is, desirable coefficients of friction, are obtained when the roller separation is small and the roller diameters are less than 15 cm. and preferably less than 10 cm. Rollers having a diameter of less than 4 cm., as have been proposed for a similar apapratus, have the drawback that they lack sufficient stiffness to cope with wide or thick sheeting, particularly as they must be hollow to allow for satisfactory heating. Since it is desirable to use small gaps between the rollers, bowing of the rollers cannot be tolerated to the extent it must occur in hollow rollers less than 40 mm. in diameter when drawing polyamide sheeting of a width of, say, 1 m. and an initial thickness of 300 microns. We therefore prefer to use rollers having a diameter between 4.5 and 7 cm., and in the preferred embodiment the rollers all have the same diameter.

The length of the free path L between adjacent rollers in the region between the last slowly driven roller and the first quickly driven roller should, in accordane with the present invention, be less than 22 mm., preferably 8 to 18 mm.

Good results are obtained, for example, with roller diameters of 50 mm. at a roller separation (gap) of 1.0 mm., in which case L is equal to 10 mm.

In order to operate the above method on an existing longitudinal drawing machine incorporating a given number of drawing rollers, it is in many cases advantageous to provide one or more driven or non-driven cooled by-pass rollers above or below the drawing rollers in order to prevent the drawn film, which passes over said by-pass rollers and thence to the take-off rollers, being heated by an excessive number of drawing rollers. If provision is made for the rollers to be horizontally adjustable, the sheeting may be readily guided out of any of the draw gaps for immediate cooling.

The sheeting, after being drawn in the machine direction in accordance with the present method, is advantageously passed direct from the take-off means of the longitudinal drawing machine to the transverse drawing machine in a continuous manner. The latter requires no special features other than those generally found on conventional clip-type drawing machines. Thus the sheeting is advantageously passed by means of conveyor chains which are parallel or exhibit about 5% convergence, through a preheating zone of highly turbulent hot air at a temperature of about 120° to 170° C. and then to the drawing zone, where it is stretched transversely at a draw ratio of 3 to 6 and at a temperature of from 165° to 205° C.

The stretched film may be cooled to a temperature below 80° C. on conveyor chains which are parallel or exhibit not more than 10% convergence immediately after drawing, or alternatively it is subjected to a heat-setting treatment after drawing but before cooling, said heat-setting being effected at a temperature between the final drawing temperature and the melting point of the material, preferably between 180° to 210° C. During tempering the film must be held under such a tension than its width remains unchanged or diminishes by not more than 10%. A heat-set polyamide film produced by the above-described method exhibits only very slight shrinkage in air at 190° C.

The two-stage stretching method of the present invention may be carried out continuously, including heat-setting, by employing a series arrangement of the machines used, such as extruder, longitudinal drawing machine, transverse drawing machine, heat-setting means, cooling means and wind-up apparatus.

The method of the invention is suitable for improving, by drawing, films or sheeting of linear polyamides such as polycaprolactam (nylon 6), polyhexamethylene adipamide (nylon 6,6), polyhexamethylene sebacamide (nylon 6,10), polyamino undecanamide (nylon 11), polylauramide (nylon 12), mixed polyamides or mixtures of these polyamides. The method is particularly valuable for drawing polyamides which crystallize well. The films produced by the method of the invention are particularly suitable for packaging applications due to their excellent optical, mechanical and chemical properties.

Apparatus adapted for carrying out the above method is illustrated in side view in FIG. 2a and in plan view in FIG. 2b. Polyamide sheeting 1 withdrawn from an extruder plant or storage roll (not shown) passes through the preheating zone 2 of a roller-type longitudinal drawing machine, where it is conveyed by the heated rollers 3, driven at a peripheral speed $V_1$, to the drawing zone 4. The sheeting, now at the drawing temperature, is further conveyed without slip by the group of cooled take-off rollers 5 driven at a peripehral speed $V_2$ to effect drawing at the ratio $V_2:V_1$, whilst the non-driven rollers in the drawing zone 4 are rotated by the moving sheeting at peripheral speeds corresponding to the speed of the sheeting. Drawing occurs in the gaps between the rollers in the drawing zone 4. The sheeting, thus drawn in the machine direction, now designated by 6, either passes continuously to the transverse drawing machine at the velocity $V_2$ in a single operation or its first wound on to the roll A and subsequently withdrawn therefrom as feed stock for the transverse drawing machine. In the latter the sheeting is gripped at its edges by clips and passes through the treatment zones 7 to 10, where it is preheated, drawn transversely to the machine direction, heat-set, cooled and then trimmed by the trimmer 11. The biaxially drawn sheeting, now designated by 12, is then wound on to a reel in the winding device 13. The heat-setting step in zone 9 may be omitted, in which case a highly shrinkable film is produced, or it may be effected as a separate operation in the transverse drawing machine, in which case the chains 14 and 15 will be maintained parallel.

Figure 3:
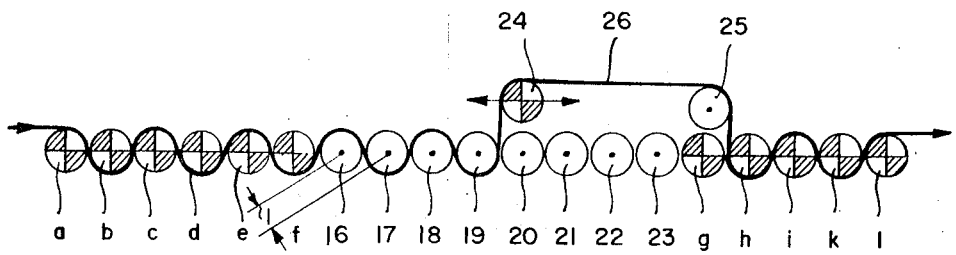

FIG. 3 shows, by way of example, a train of rollers in a longitudinal drawing machine with auxiliary means for by-passing some of the heated drawing rollers as desired. The rollers a to f have a slow drive and serve to preheat the sheeting, whilst the rollers g to l have a fast drive and serve to cool and haul off the sheeting. The intermediate rollers 16 to 23 are non-driven and are generally heated to the drawing temperature. The diameters of rollers f and g and 16 to 23 are the same, being between 40 and 100 mm. In the zone extending from roller f to roller g the free path $L_1$ between adjacent rollers is preferably of the same length in all of the gaps between the rollers and is less than 22 mm. in length.

The roller 24 is driven and cooled and may be horizontally displaced in such a way that the forward-drawn sheeting 26 may be looped out of the train of drawing rollers at every other draw gap therein as desired, to be cooled and transported to the take-off rollers. The roller 25 shown in the figure may take the form of a cooled pressure roll or, alternatively, it may be an adjustable cooling roll with drive.

The invention is illustrated in the following example.

EXAMPLE

A substantially amorphous film having a density of 1.127 g./cm.$^3$ and a thickness of 0.2 mm. was made from polycaprolactam (nylon 6) having a relative viscosity of 4.0 as measured in 96% sulfuric acid at 25° C.

This film was first of all drawn in the machine direction at a draw ratio of approximately 3. In this first stage the film was first preheated to a temperature of 80° C. in about 3 seconds as it passed through a train of nine rollers heated to that temperature. The preheated film was hauled through a train of four drawing rollers by eight fast-driven take-off rollers without slip and was thus drawn in five draw gaps at a temperature of 150° C. in a total drawing time of about 0.16 second. Water at 20° C. was passed through the take-off rollers. All of the rollers had a diameter of 45 mm., the free gap between the rollers being uniformly about 1.1 mm.

The resulting film drawn in the machine direction had a uniform thickness (about 0.07 mm.). It had a uniform width of 31 cm., the reduction in width being about 3%. The film was then drawn in the transverse direction at a draw ratio of about 4 on a conventional clamp-type transverse drawing machine. In this stage the film was first passed through a hot-air preheating zone 3 m. in length at a speed of 10 m./min., where it was preheated to 115° C. The preheated film was then drawn transversely at 175° C. in a period of about 30 seconds. The biaxially drawn film was cooled by passing through a cold-air cooling zone, where its width was reduced by 8%.

The resultant biaxially hot-drawn film had uniform thickness (0.018 mm.), excellent tensile strength and good elongation.

Its density was 1.141 g./cm.$^3$.

This biaxially drawn film was subsequently tempered for 2 minutes at 190° C., during which period it was kept under such a tension that its shrinkage in the transverse direction was 4%. There was thus produced a film having a tensile strength in the machine direction of over 2,500 kg./cm.$^2$, a shrinkage (15 minutes in hot air at 180° C.) of 1.5% in the machine direction and of 3.5% in the transverse direction, and a density of 1.145 g./cm.$^3$.

In spite of its high density, the film was fully transparent.

The permeability of the film to various gases is given in the following table on the basis of a film thickness of 100 microns.

|  | Undrawn | Drawn biaxially |
|---|---|---|
| Water vapor | 14.4 | 5.9 |
| Hydrogen | 2.3 | $6.10^{-1}$ |
| Nitrogen | $<5 \times 10^{-2}$ | + |
| Oxygen | $6.10^{-2}$ | + |
| Carbon dioxide | 5.5 | $2.10^{-1}$ |
| Air | $<5.10^{-2}$ | + |

NOTE.—+ No gas penetration during a measuring period of 48 to 90 hours; units gas: (cm.$^3$ 100μm./dm.$^2$) 20° C., differential pressure 1 atmosphere; water vapor: (g. 100μm./m.$^2$), 20° C., 85/0% relative humidity (humidity gradient).

We claim:

1. In a process for producing biaxially oriented polyamide film by successively drawing non-oriented or only slightly oriented sheeting on a roller-type drawing machine for drawing in the machine direction and on a further machine for drawing in the transverse direction, the sheeting feed stock being initially drawn in the machine direction to 2.5 to 4 times its original length after a preheating time of not longer than 30 seconds in the gaps between non-driven drawing rollers in free paths each of less than 20 mm. in length, then being drawn in the transverse direction, the transversely drawn sheeting then being heat set at a temperature between the drawing temperature and the temperature at which the sheeting material melts, the sheeting finally being cooled to a temperature of below 100° C. while preventing shrinkage in the transverse direction of by more than 10%, the improvement which comprises:
    (a) maintaining the preheating temperature of the sheeting during drawing in the machine direction at from 70° to 100° C.,
    (b) maintaining the diameter of the rollers at from 45 to 70 mm.,
    (c) maintaining the drawing rollers, which assume a peripheral speed below the take-off speed of the sheeting or the said take-off speed less 10% of the maximum speed difference, at a temperature of from 120° to 160° C., and the immediately following non-driven and/or driven rollers are at a temperature of from 20° to 40° C., and
    (d) after drawing the sheeting in the machine direction transversely drawing the sheeting to 3 to 6 times its original width at a drawing temperature of from 165° to 205° C.

2. A process as in claim 1, wherein less than five drawing rollers are maintained at the drawing temperature and effectively take part in drawing in the machine direction.

3. A process as in claim 1 wherein only one drawing roller is maintained at the drawing temperature and effectively takes part in drawing in the machine direction.

References Cited

UNITED STATES PATENTS

| 2,767,435 | 10/1956 | Alles | 264—289 |
|---|---|---|---|
| 2,779,684 | 1/1957 | Alles | 264—289 |
| 2,823,421 | 2/1958 | Scarlett | 264—289 |
| 2,851,733 | 9/1958 | Pangonis et al. | 264—289 |
| 2,920,352 | 1/1960 | Miller et al. | 264—289 |
| 2,968,065 | 1/1961 | Gronholz | 264—289 |
| 3,351,697 | 4/1967 | Hufnagel et al. | 264—289 |
| 3,502,766 | 3/1970 | Tsuruda et al. | 264—289 |
| 3,510,552 | 5/1970 | Tsuruda et al. | 264—289 |

JAY H. WOO, Primary Examiner

U.S. Cl. X.R.

264—288